US011545891B2

(12) United States Patent
Lai et al.

(10) Patent No.: US 11,545,891 B2
(45) Date of Patent: Jan. 3, 2023

(54) POWER DEVICE AND OPERATION METHOD THEREOF

(71) Applicant: DELTA ELECTRONICS, INC., Taoyuan (TW)

(72) Inventors: Chien-An Lai, Taoyuan (TW); Jyun-Jhe Jhang, Taoyuan (TW); Chien-Yao Liao, Taoyuan (TW); Ping-Sheng Wu, Taoyuan (TW); I Chen, Taoyuan (TW); Chang-Yuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/444,668

(22) Filed: Aug. 8, 2021

(65) Prior Publication Data

US 2022/0173653 A1 Jun. 2, 2022

(30) Foreign Application Priority Data

Nov. 27, 2020 (CN) .......................... 202011362406.6

(51) Int. Cl.
*H02M 1/42* (2007.01)
*H02M 5/458* (2006.01)
*H02M 3/156* (2006.01)
*H02M 3/158* (2006.01)
*H02M 1/00* (2006.01)

(52) U.S. Cl.
CPC ....... *H02M 1/4225* (2013.01); *H02M 1/0096* (2021.05); *H02M 1/4266* (2013.01); *H02M 3/156* (2013.01); *H02M 3/158* (2013.01); *H02M 5/458* (2013.01)

(58) Field of Classification Search
CPC .... H02M 1/42; H02M 1/4225; H02M 1/4266; H02M 3/156; H02M 3/158
See application file for complete search history.

(56) References Cited

U.S. PATENT DOCUMENTS

| 6,288,918 | B1 | 9/2001 | Tarodo et al. |
| 8,872,485 | B1 | 10/2014 | Kung et al. |
| 10,338,658 | B2 | 7/2019 | Hung et al. |
| 11,063,512 | B1 * | 7/2021 | Hsiao ..................... H02M 3/156 |

(Continued)

FOREIGN PATENT DOCUMENTS

CN 101645660 B 12/2011

*Primary Examiner* — Gary L Laxton
(74) *Attorney, Agent, or Firm* — CKC & Partners Co., LLC

(57) ABSTRACT

A power device includes a power factor corrector, an auxiliary capacitor, a switching device, an auxiliary boost circuit, a controller and a voltage conversion device. The switching device has a first end electrically connected to the output end of the power factor corrector, and a second end electrically connected to one end of the auxiliary capacitor. An output end of the auxiliary boost circuit is electrically connected to the output end of the power factor corrector, an input end of the auxiliary boost circuit is electrically connected to a middle end of the switching device, and a ground end of the auxiliary boost circuit is electrically connected to another end of the auxiliary capacitor. The controller is electrically connected to the switching device and the auxiliary boost circuit. The input end of the voltage conversion device is electrically connected to the output end of the power factor corrector.

17 Claims, 3 Drawing Sheets

(56) References Cited

U.S. PATENT DOCUMENTS

| | | | |
|---|---|---|---|
| 2010/0014330 A1* | 1/2010 | Chang | H02M 7/2176 |
| | | | 363/89 |
| 2020/0039375 A1* | 2/2020 | Ammanamanchi Venkata | |
| | | | H02J 7/022 |
| 2021/0070190 A1* | 3/2021 | Liu | H02M 1/14 |
| 2021/0152087 A1* | 5/2021 | Mathews | H02M 1/08 |

* cited by examiner

POWER DEVICE AND OPERATION METHOD THEREOF

CROSS-REFERENCE TO RELATED APPLICATION

This application claims priority to China Application Serial Number 202011362406.6, filed Nov. 27, 2020, which is herein incorporated by reference in its entirety.

BACKGROUND

Field of Invention

The present invention relates to devices and methods, and more particularly, power devices and operation methods thereof.

Description of Related Art

In the application environment of the power supply, system data is very important. In the case of unstable input voltage, a stable output voltage is required to maintain system operation or data storage. Therefore, in a normal operation, when the input power source is powered off suddenly, the hold up time of the output power of the power supply is required and ranges from about 10 ms to 20 ms. The design of the hold up time can directly affect the design of the working range of the second-stage DC converter.

The current practice is to increase the output capacitance of the power factor corrector, which results in a decrease in power density. Alternatively, the working range of the input of the post stage is increased, but the larger working range usually has the lower efficiency during the normal operation.

The first conventional technology is to add a boost circuit in series at the post stage of the power factor corrector, and when the input alternating current (AC) voltage disappears, the energy of the back stage is provided to maintain the output. However, because the boost circuit is connected in series with the circuit, the loss is increased during normal operation, and the overall efficiency is reduced. Furthermore, when the input is instantly powered down and then recovered, because the energy of the main capacitor has dropped to a very low level, a huge inrush current occurs at the input end. The inrush current may cause the circuit breaker at the input end to trip or the uninterruptable power system (UPS) to be in protection.

The second conventional technology is to add a three-switch buck circuit in parallel with the post stage of the power factor corrector, in which one switch is used to control the charging of the capacitor, and the other two switches form a buck circuit. When the input AC voltage disappears, the energy of the main capacitor is provided to maintain the output. However, the ability of the buck circuit to maintain the output voltage is limited.

SUMMARY

In one or more various aspects, the present disclosure is directed to power devices and operation methods thereof.

An embodiment of the present disclosure is related to a power device includes a power factor corrector, an auxiliary capacitor, a switching device, an auxiliary boost circuit, a controller and a voltage conversion device. The switching device has a first end, a second end and a middle end, the first end is electrically connected to an output end of the power factor corrector, and the second end is electrically connected to one end of the auxiliary capacitor. The auxiliary boost circuit has an output end, an input end and a ground end, the output end of the auxiliary boost circuit is electrically connected to the output end of the power factor corrector, the input end of the auxiliary boost circuit is electrically connected to the middle end, and the ground end is electrically connected to another end of the auxiliary capacitor. The controller is electrically connected to the switching device and the auxiliary boost circuit. The voltage conversion device has an input end electrically connected to the output end of the power factor corrector. The controller is configured to control switching of the switching device and the auxiliary boost circuit, so that electric power of the auxiliary capacitor regulates a voltage of the output end of the power factor corrector through the switching device and the auxiliary boost circuit.

Another embodiment of the present disclosure is related to an operation method of the power device. The power device includes a power factor corrector, a voltage conversion device and an auxiliary circuit connected to the voltage conversion device in parallel at an output end of the power factor corrector. The operation method includes steps of: (A) controlling a switching device of the auxiliary circuit in a first switching state in response to the power factor corrector operating, so that the output end of the power factor corrector charges an auxiliary capacitor of the auxiliary circuit through the switching device; (B) maintaining the switching device in the first switching state in response to the power factor corrector stopping operation by not exceeding a preset time period; (C) switching the switching device to a second switching state in response to the power factor corrector stopping operation by exceeding the preset time period, so that the auxiliary capacitor regulates a voltage of the output end of the power factor corrector through the switching device and an auxiliary boost circuit of the auxiliary circuit respectively.

Technical advantages are generally achieved, by embodiments of the present disclosure. As the requirements for high efficiency and high power density become more and more severe in the future, the technique of the present disclosure of improving the hold up time can greatly improve the work efficiency. The power density can be increased by reducing the size of the main capacitor. The auxiliary circuit is easy to be modularized design that has great technical values, without the adverse effect of the traditional auxiliary boost circuit.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
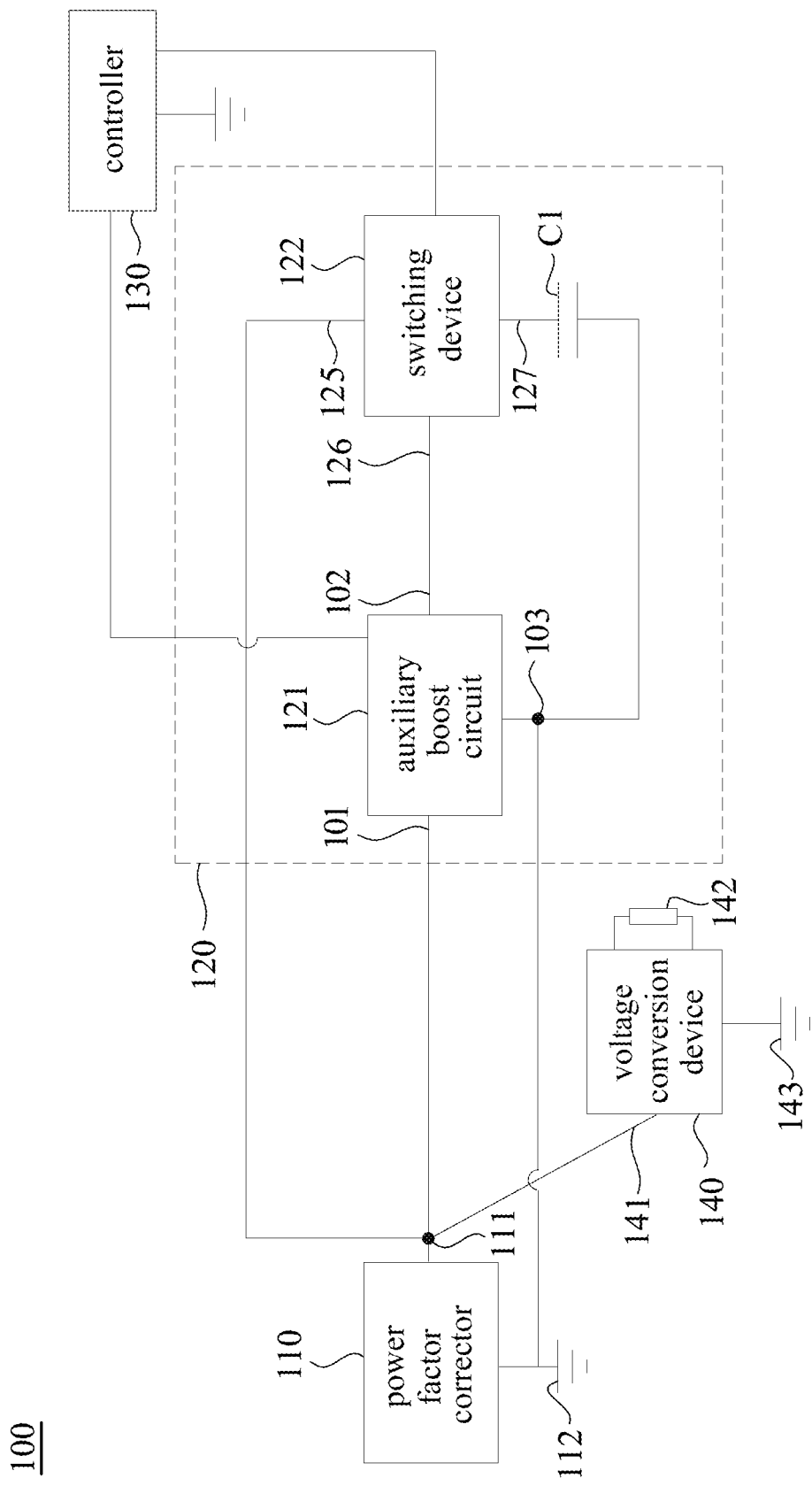
FIG. 1 is a block diagram of a power system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a power device 100 according to one embodiment of the present disclosure. As shown in FIG. 1, an auxiliary circuit 120 is added to the post stage of a power factor corrector 110. The power device 100 includes an auxiliary boost circuit 121, a switching device 122 and an auxiliary capacitor C1. In structure, the first end 125 and the second end 127 of the switching device 122 can be two opposing ends, the middle end 126 of the switching device 122 can be a node between the first end 125 and the second end 127. The first end 125 of the switching device 122 is electrically connected to the output end 111 of the power factor corrector 110. One end of the auxiliary capacitor C1 is electrically connected to the second end 127 of the switching device 122, the output end 101 of the auxiliary boost circuit 121 is electrically connected to the output end 111 of the power factor corrector 110, the input end 102 of the auxiliary boost circuit 121 is electrically connected to the middle end 126 of the switching device 122, and the ground end 103 of the auxiliary boost circuit 121 is electrically connected to another end of the auxiliary capacitor C1. The controller 130 is electrically connected to the power factor corrector 110, the switching device 122 and the auxiliary boost circuit 121. The voltage conversion device 140 (e.g., a DC-to-DC converter) and the auxiliary circuit 120 are disposed in parallel, and the input end 141 of the voltage conversion device 140 is electrically connected to the output end 111 of the power factor corrector 110. The output of the voltage conversion device 140 is electrically connected to the load 142. The ground end 112 of the power factor corrector 110, the ground end 103 of the auxiliary boost circuit 121 and the ground end 143 of the voltage conversion device 140 are configured as a common ground. In practice, the controller 130 can be one, more or all of control circuits of the power device 100, and can selectively include an external control circuit. Those with ordinary skill in the art may flexibly design the controller 130 depending on the desired application.

The controller 130 can send a disable signal in response to the input power source 162 being powered off, so that the power factor corrector 110 stops operating. The controller 130 switches the switching device 122 through the change-over switch S5 (e.g., a bipolar junction transistor, BJT) and turns on the auxiliary boost circuit 121, so that electric power of the auxiliary capacitor C1 can regulate a voltage of the output end 111 of the power factor corrector 110 through the switching device 122 and the auxiliary boost circuit 121. In other words, energy of the auxiliary capacitor C1 is returned to the main circuit (e.g., the power factor corrector 110). Thus, the voltage of the output end 111 of the power factor corrector 110 can be held over a certain voltage level (e.g., 95% or more of the normal voltage of the output end 111 during the power factor corrector 110 operates in normal), so as to maintain operation of the post power stage (e.g., the voltage conversion device 140 and the load 142), and this operation can reduce the working range of the post power stage, and therefore the best operating point can be implemented.

Figure 2:
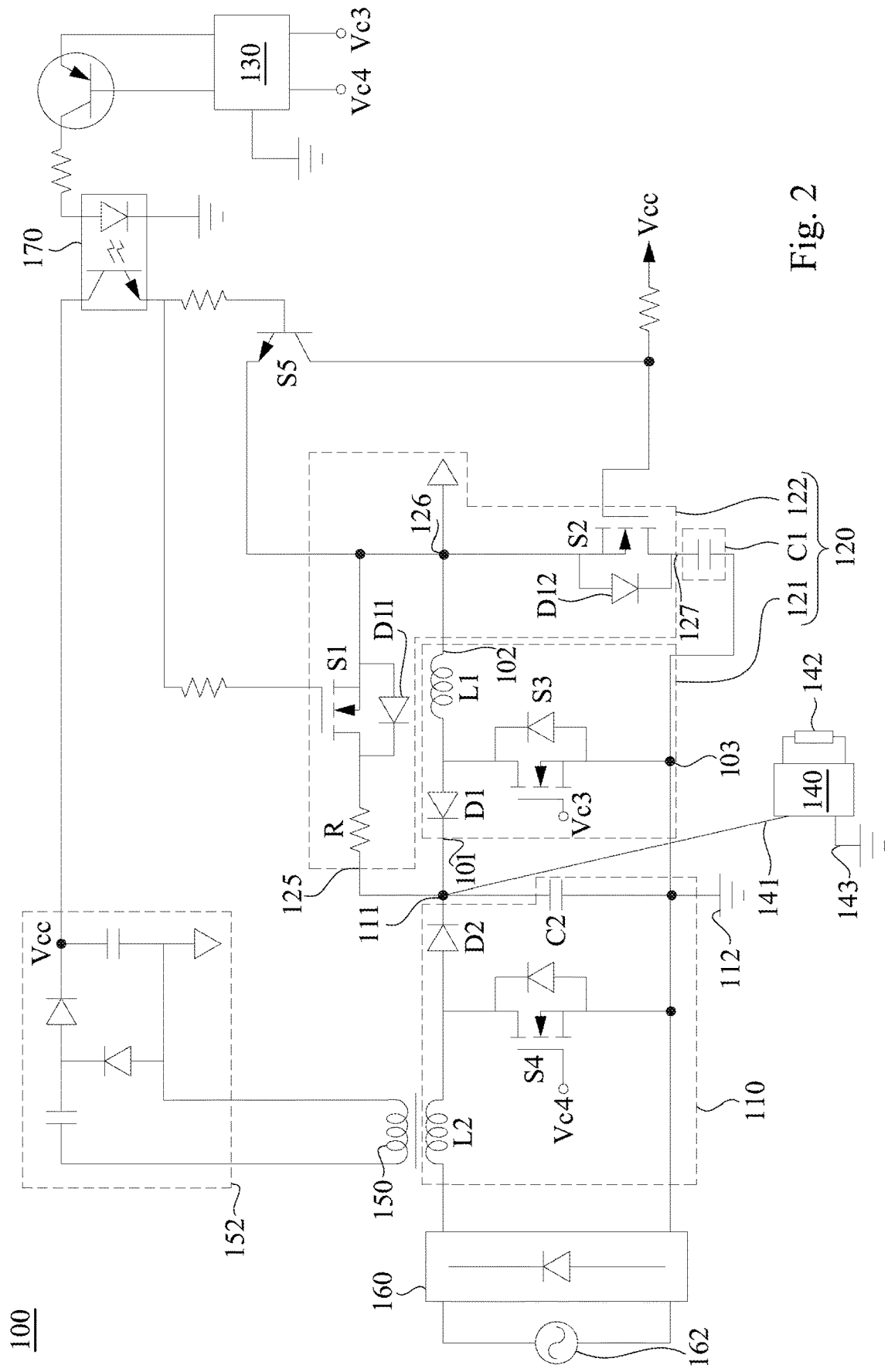
FIG. 2 is a circuit diagram of a power system according to one embodiment of the present disclosure.

For a more complete understanding the hardware architecture of the power device 100, referring FIGS. 1-2, FIG. 2 is a circuit diagram of a power device 100 according to one embodiment of the present disclosure. As shown in FIG. 2, the auxiliary boost circuit 121 includes an auxiliary diode D1, an auxiliary switch S3 and the auxiliary inductor L1. In structure, the cathode of the auxiliary diode D1 is electrically connected to the output end 101 of the auxiliary boost circuit 121, and is electrically connected to the output end 111 of the power factor corrector 110. One end (e.g., a drain) of the auxiliary switch S3 (e.g., an enhancement-mode, n-channel MOSFET) is electrically connected to the anode of the auxiliary diode D1, another end (e.g., a source) of the auxiliary switch S3 is electrically connected to the ground end 103, and the control end (e.g., a gate) of the auxiliary switch S3 is coupled to the controller 130. One end of the auxiliary inductor L1 is electrically connected to of one end the auxiliary switch S3, and another end of the auxiliary inductor L1 is electrically connected to the input end 102 of the auxiliary boost circuit 121.

In one embodiment of the present disclosure, the switching device 122 can be a back-to-back device, which includes a first semiconductor switch S1 and a second semiconductor switch S2. In structure, one end (e.g., a drain) of the first semiconductor switch S1 (e.g., an enhancement-mode, n-channel MOSFET) is electrically connected to the first end 125 and the output end 111 of the power factor corrector 110, and another end (e.g., a source) of the first semiconductor switch S1 is electrically connected to the middle end 126 and the input end 102 of the auxiliary boost circuit 121. The first semiconductor switch S1 has a first body diode D11, and the cathode and the anode of the first body diode D11 are electrically connected to one end and another end of the first semiconductor switch S1 respectively. One end (e.g., a source) of the second semiconductor switch S2 (e.g., an enhancement-mode, n-channel MOSFET) is electrically connected to another end of the first semiconductor switch S1, the middle end 126 and the input end 102 of the auxiliary boost circuit 121, and another end (e.g., a drain) of the second semiconductor switch S2 is electrically connected to the second end 127 and one end of the auxiliary capacitor C1. The second semiconductor switch S2 has a second body diode D12, and the anode and the cathode of the second body diode D12 are electrically connected to one end and another end of the second semiconductor switch S2 respectively.

In one embodiment of the present disclosure, the switching device 122 further includes a current-limiting resistor R. In structure, the current-limiting resistor R is electrically connected between the first semiconductor switch S1 and the output end 111 of the power factor corrector 110. Alternatively, in another embodiment of the present disclosure, the controller 130 controls the current flow of the first semiconductor switch S1, without the current-limiting resistor R.

In one embodiment of the present disclosure, the power factor corrector 110 includes a main capacitor C2, a diode D2, a switch S4 and a first inductor L2. In structure, two ends of the main capacitor C2 are electrically connected to the output end 111 and the ground end 112 of the power factor corrector 110 respectively, and are electrically connected to the output end 101 and the ground end 103 of the auxiliary boost circuit 121 respectively. The cathode of the diode D2 is electrically connected to the cathode of the auxiliary diode D1. Two ends (e.g., a drain and a source) of the switch S4 (e.g., an enhancement-mode, n-channel MOSFET) are electrically connected to the anode of the diode D2 and the ground end 112 respectively, and the control end (e.g., a gate) of the switch S4 is coupled to the controller 130. Two ends of the first inductor L2 are electrically connected to the anode of the diode D2 and a rectifier 160 respectively, and the rectifier 160 is electrically connected to an input power source 162.

In one embodiment of the present disclosure, the power device 100 further includes a second inductor 150 and a voltage multiplier 152. In structure, the second inductor 150 is inductively coupled to the first inductor L2, and the voltage multiplier 152 is electrically connected to the second inductor 150.

In one embodiment of the present disclosure, the power device 100 further includes an optical coupler 170. In structure, the optical coupler 170 is electrically connected to the voltage multiplier 152, the controller 130 and the switching device 122.

In one embodiment of the present disclosure, the power device 100 further includes a changeover switch S5 (e.g., a bipolar junction transistor, BJT). In structure, one end (e.g., an emitter) of the changeover switch S5 is electrically connected to another end (e.g., a source) of the first semiconductor switch S1, and another end (e.g., a collector) of the changeover switch S5 is electrically connected to the control end (e.g., a gate) of the second semiconductor switch S2, and the control end (e.g., a base) of the changeover switch S5 is electrically connected to the control end (e.g., a gate) of the first semiconductor switch S1 and is coupled to the controller 130. In this way, the controller 130 can only control its one control pin to implement that two control signals for the first and second semiconductor switch S1 and S2 are inverted to each other. In other words, the first semiconductor switch S1 is turned on while the second semiconductor switch S2 is turned off, or the first semiconductor switch S1 is turned off while the second semiconductor switch S2 is turned on; however, the present disclosure is not limited thereto. In another embodiment, the controller 130 can directly provide individual control signals to control the first semiconductor switch S1 and the second semiconductor switch S2 respectively.

Specifically, during operation, in the primary side, the power factor corrector 110 needs to detect AC loss to ensure that the input power source 162 is powered off, but the detection needs to be delayed to avoid the AC at the normal zero-crossing point with incorrect operation. Therefore, the operation of the power device 100 can be divided into three sections: a normal condition, the AC loss for not exceeding a preset time period, and the AC loss for exceeding the preset time period.

In the normal condition (i.e., AC does not lose power), the input power source 162 provide AC, and the rectifier 160 transforms the AC to DC. The controller 130 can modulate the voltage Vc4 to the control end of the switch S4, so as to control the switch S4 to be turned on and turned off alternately, so that the power factor corrector 110 can operate. Furthermore, electric power is coupled from the first inductor L2 to the second inductor 150, so that the voltage multiplier 152 can provide an auxiliary power Vcc for the switching device 122. The controller 130 sends a control signal to turn on the first semiconductor switch S1 and turn off the second semiconductor switch S2 through the changeover switch S5. The auxiliary switch S3 is in a blocking state, so that the auxiliary boost circuit 121 does not operate. The voltage of the output end 111 of the power factor corrector 110 charges the auxiliary capacitor C1 through the first semiconductor switch S1 and the second body diode D12; after the charging is completed, this circuit almost has no power consume that does not result in loss in the normal condition, thereby avoiding reduction in power conversion efficiency.

In the AC loss for not exceeding the preset time period (e.g., about 2 ms), the input power source 162 is powered off; the first semiconductor switch S1 is still turned on and the second semiconductor switch S2 is still turned off. The power factor corrector 110 stops operating for not exceeding the preset time period, the auxiliary switch S3 also maintains the blocking state. The main capacitor C2 provides electric power for the voltage conversion device 140, and therefore the voltage of the main capacitor C2 is lower than the voltage of the auxiliary capacitor C1, so that the second body diode D12 is in the cut-off state.

In the AC loss for exceeding the preset time period, the power factor corrector 110 stops operating for exceeding the preset time period; the controller 130 can send an inversion control signal that is inverted to above originally control signal to turn off the first semiconductor switch S1 and turn on the second semiconductor switch S2 through the changeover switch S5, and modulates the voltage Vc3 to the control end of the auxiliary switch S3, so as to control the auxiliary switch S3 to be turned on and turned off alternately, so that the auxiliary boost circuit 121 can operate. The voltage of the auxiliary capacitor C1 is higher than the voltage of the main capacitor C2; therefore, one current path is that the auxiliary capacitor C1 charges the main capacitor C2 through the second semiconductor switch S2 and the first body diode D11, and the other current path is that the auxiliary capacitor C1 charges the main capacitor C2 through the auxiliary switch S3 of the auxiliary boost circuit 121 controlled by a pulse width modulation (PWM) control signal of the controller 130. While the voltage of the auxiliary capacitor C1 continues to drop, the duty cycle of the PWM control signal for the auxiliary switch S3 is getting larger and larger, to achieve the voltage regulation of the main capacitor C2, thereby lengthening the hold up time effectively.

The voltage of the main capacitor C2 of the main circuit can be maintained at a high level. If the input power supply 162 is instantly powered down and restored, a huge inrush current does not occur, thereby protecting all components in the circuit.

In practice, nowadays the demand for power supply wattage is increased, and the hold up time is needed to be longer. In a control experiment, the voltage of the main capacitor C2 drops when shutdown, and then the current of the primary side of the post isolation stage circuit (e.g., a DC-to-DC converter) gradually increases and is even higher than the withstand current of the switch (e.g., a MOSFET) when the auxiliary circuit 120 is omitted; thus, it is necessary to select a semiconductor switch capable of withstanding a higher current. The structure of the auxiliary circuit 120 can make the input voltage of the isolation stage is clamped at a voltage level, thereby lengthening the working time of the post power converter without using components capable of withstanding the higher current.

Figure 3:
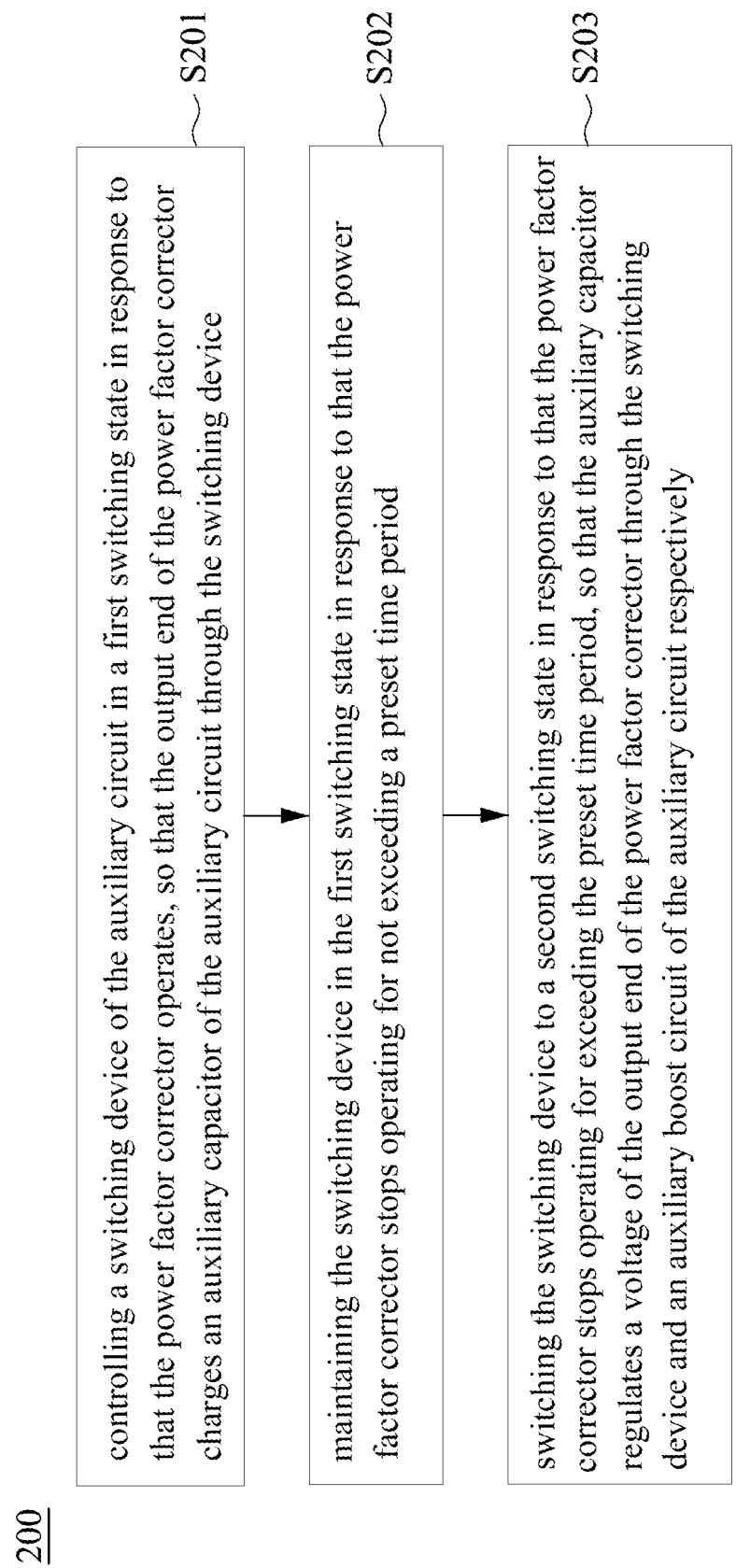
FIG. 3 is a flow chart of an operation method of the power device according to one embodiment of the present disclosure.

For a more complete understanding of an operation method of the power device 100, referring FIGS. 1-3, FIG. 3 is a flow chart of an operation method 300 of the power device 100 according to one embodiment of the present disclosure. In FIGS. 1 and 2, the power device 100 includes the power factor corrector 110, the voltage conversion device 140 and the auxiliary circuit 120 connected to the voltage conversion device 140 in parallel at the output end 111 of the power factor corrector 110. As shown in FIG. 3, the operation method 200 includes operations S201, S202 and S203. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S201, the switching device 122 of the auxiliary circuit 120 is controlled in a first switching state in response to the power factor corrector 110 operating, so that the output end 111 of the power factor corrector 110 charges the auxiliary capacitor C1 of the auxiliary circuit 120 through the switching device 122.

In operation S202, the switching device 122 is maintained in the first switching state in response to the power factor corrector 110 stopping operation by not exceeding the preset time period. At this time, the main capacitor C2 of the power factor corrector 110 provides electric power for the voltage conversion device 140 that is connected to the auxiliary circuit 120 in parallel.

In operation S203, the switching device 122 is switched to the second switching state in response to the power factor corrector 110 stopping operation by exceeding the preset time period, so that the auxiliary capacitor C1 regulates the voltage of the output end 111 of the power factor corrector 110 through the switching device 122 and the auxiliary boost circuit 121 of the auxiliary circuit 120 respectively.

In one embodiment of the present disclosure, operation S201 operates in the normal condition (i.e., AC does not lose power), during which the first semiconductor switch S1 is turned on and the second semiconductor switch S2 is turned off in the first switching state of the switching device 122 in response to the power factor corrector 110 operating, and the auxiliary switch S3 is in the blocking state, so that the auxiliary boost circuit 121 cannot operate. The voltage of the output end 111 of the power factor corrector 110 charges the auxiliary capacitor C1 through the first semiconductor switch S1 and the second body diode D12. Furthermore, electric power is coupled from the first inductor L2 to the second inductor 150, so that the voltage multiplier 152 can provide the auxiliary power Vcc for the switching device 122.

In one embodiment of the present disclosure, operation S202 operates in the AC loss for not exceeding the preset time period, during which the first semiconductor switch S1 is turned on and the second semiconductor switch S2 is turned off in the first switching state of the switching device 122 in response to the power factor corrector 110 stopping operation by not exceeding the preset time period, and the auxiliary switch S3 is in the blocking state. The voltage of the main capacitor C2 is lower than the voltage of the auxiliary capacitor C1, so that the second body diode D12 is in the cut-off state. The main capacitor C2 provides electric power for the voltage conversion device 140.

In one embodiment of the present disclosure, operation S203 operates in the AC loss for exceeding the preset time period, during which the first semiconductor switch S1 is turned off and the second semiconductor switch S2 is turned on in the second switching state of the switching device 122 in response to the power factor corrector 110 stopping operation by exceeding the preset time period, and the auxiliary switch S3 is controlled to be turned on and turned off alternately, so that the auxiliary boost circuit 121 can operate. The auxiliary capacitor C1 charges the main capacitor C2 through the second semiconductor switch S2 and the first body diode D11 and also through the auxiliary inductor L1 and the auxiliary diode D1.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power device, comprising:
a power factor corrector;
an auxiliary capacitor;
a switching device having a first end, a second end and a middle end, the first end electrically connected to an output end of the power factor corrector, and the second end electrically connected to one end of the auxiliary capacitor;
an auxiliary boost circuit having an output end, an input end and a ground end, the output end of the auxiliary boost circuit electrically connected to the output end of the power factor corrector, the input end of the auxiliary boost circuit electrically connected to the middle end, and the ground end electrically connected to another end of the auxiliary capacitor;
a controller electrically connected to the switching device and the auxiliary boost circuit; and
a voltage conversion device having an input end electrically connected to the output end of the power factor corrector,
the controller configured to control switching of the switching device and the auxiliary boost circuit, so that electric power of the auxiliary capacitor regulates a voltage of the output end of the power factor corrector through the switching device and the auxiliary boost circuit.

2. The power device of claim 1, wherein the switching device comprising:
a first semiconductor switch having one end electrically connected to the first end and the output end of the power factor corrector, and another end electrically connected to the middle end and the input end of the auxiliary boost circuit, the first semiconductor switch having a first body diode, and a cathode and an anode of the first body diode electrically connected to the one end and the another end of the first semiconductor switch respectively; and a second semiconductor switch having one end electrically connected to the another end of the first semiconductor switch, the middle end and the input end of the auxiliary boost circuit, and another end electrically connected to the second end and the one end of the auxiliary capacitor, the second semiconductor switch having a second body diode, and an anode and a cathode of the second body diode electrically connected to the one end and the another end of the second semiconductor switch respectively.

3. The power device of claim 2, wherein the auxiliary boost circuit comprising:

an auxiliary diode having a cathode electrically connected to the output end of the auxiliary boost circuit;

an auxiliary switch having one end electrically connected to an anode of the auxiliary diode, another end of the auxiliary switch electrically connected to the ground end of the auxiliary boost circuit, and a control end of the auxiliary switch coupled to the controller; and an auxiliary inductor having one end electrically connected to the anode of the auxiliary diode, and another end electrically connected to the input end of the auxiliary boost circuit.

4. The power device of claim 3, wherein the controller turns on the first semiconductor switch and turns off the second semiconductor switch in response to that the power factor corrector operates, and the auxiliary switch is in a blocking state.

5. The power device of claim 4, wherein the power factor corrector is electrically connected to an input power source, the auxiliary switch maintains the blocking state in response to that the power factor corrector stops operating for not exceeding a preset time period after the input power source is powered off.

6. The power device of claim 4, wherein the controller turns off the first semiconductor switch, turns on the second semiconductor switch, and controls the auxiliary switch to be turned on and turned off alternately in response to that the power factor corrector stops operating for exceeding the preset time period.

7. The power device of claim 2, further comprising:

a changeover switch having one end electrically connected to the another end of the first semiconductor switch, another end electrically connected to a control end of the second semiconductor switch, and a control end coupled to a control end of the first semiconductor switch and the controller.

8. The power device of claim 3, wherein the switching device further comprises:

a current-limiting resistor electrically connected between the first semiconductor switch and the output end of the power factor corrector.

9. The power device of claim 1, wherein the power factor corrector comprises:

a main capacitor having two ends electrically connected to the output end and the ground end of the auxiliary boost circuit respectively;

a diode having a cathode electrically connected to the output end of the auxiliary boost circuit;

a switch having two ends electrically connected to an anode of the diode and the ground end respectively, and a control end coupled to the controller; and a first inductor having two ends electrically connected to the anode of the diode and a rectifier respectively, and the rectifier electrically connected to an input power source.

10. The power device of claim 9, further comprising:

a second inductor inductively coupled to the first inductor;

a voltage multiplier electrically connected to the second inductor; and an optical coupler electrically connected to the voltage multiplier, the controller and the switching device.

11. An operation method of a power device, the power device includes a power factor corrector, a voltage conversion device and an auxiliary circuit connected to the voltage conversion device in parallel at an output end of the power factor corrector, and the operation method comprising steps of:

(A) controlling a switching device of the auxiliary circuit in a first switching state in response to the power factor corrector operating, so that the output end of the power factor corrector charges an auxiliary capacitor of the auxiliary circuit through the switching device;

(B) maintaining the switching device in the first switching state in response to the power factor corrector stopping operation by not exceeding a preset time period; and (C) switching the switching device to a second switching state in response to the power factor corrector stopping operation by exceeding the preset time period, so that the auxiliary capacitor regulates a voltage of the output end of the power factor corrector through the switching device and an auxiliary boost circuit of the auxiliary circuit respectively.

12. The operation method of claim 11, wherein the auxiliary boost circuit includes an auxiliary diode, an auxiliary switch and an auxiliary inductor, a cathode of the auxiliary diode is electrically connected to the output end of the power factor corrector, one end of the auxiliary switch is electrically connected to an anode of the auxiliary diode, another end of the auxiliary switch is electrically connected to a ground end, and one end of the auxiliary inductor is electrically connected to the one end of the auxiliary switch.

13. The operation method of claim 12, wherein the switching device includes a first semiconductor switch and a second semiconductor switch, one end of the first semiconductor switch is electrically connected to the output end of the power factor corrector, another end of the first semiconductor switch is electrically connected to another end of the auxiliary inductor, one end of the second semiconductor switch is electrically connected to the another end of the first semiconductor switch, another end of the second semiconductor switch is electrically connected to the one end of the auxiliary capacitor, the first semiconductor switch has a first body diode, a cathode and an anode of the first body diode are electrically connected to the one end and the another end of the first semiconductor switch respectively, the second semiconductor switch has a second body diode, and an anode and a cathode of the second body diode are electrically connected to the one end and the another end of the second semiconductor switch respectively.

14. The operation method of claim 13, wherein the step (A) comprises:

turning on the first semiconductor switch and turning off the second semiconductor switch in the first switching state of the switching device in response to the power factor corrector operating, and the auxiliary switch being in a blocking state, so that the auxiliary boost circuit does not operate.

15. The operation method of claim 13, wherein the step (B) comprises:
turning on the first semiconductor switch and turning off the second semiconductor switch in response to the power factor corrector stopping operation by not exceeding the preset time period, and the auxiliary switch being in the blocking state.

16. The operation method of claim 13, wherein the step (C) comprises:
turning off the first semiconductor switch and turning on the second semiconductor switch in the second switching state of the switching device in response to the power factor corrector stopping operation by exceeding the preset time period, and controlling the auxiliary switch to be turned on and turned off alternately, so that the auxiliary boost circuit operates.

17. The operation method of claim 11, wherein the power device comprises a second inductor inductively coupled to a first inductor of the power factor corrector, the second inductor is electrically connected to a voltage multiplier, so that the voltage multiplier provides an auxiliary power for the switching device through an inductive coupling of the first and second inductors.

* * * * *